Patented Sept. 2, 1952

2,609,389

UNITED STATES PATENT OFFICE 2,609,389

PREPARATION OF CERTAIN SALTS OF ALKYLENE BIS-DITHIOCARBAMIC ACIDS

Albert L. Flenner, Wilmington, Del., assignor to E. I. du Pont de Nemours & Company, Wilmington, Del., a corporation of Delaware No Drawing. Application May 14, 1949, Serial No. 93,430

4 Claims. (Cl. 260—500)

This invention relates to processes for the manufacture of salts of alkylene bis-dithiocarbamic acids. More particularly it relates to processes in which a salt of an alkylene bis-dithiocarbamic acid is formed by the interaction of an alkylene diamine, carbon disulfide, and a strong base by adding carbon disulfide gradually with agitation to a solution of the alkylene diamine in an inert solvent to form an intermediate reaction product, and reacting the intermediate product with the strong base by gradual addition of the base thereto with agitation. Still more specifically the invention relates to processes for the preparation of aqueous solutions of disodium ethylene bis-dithiocarbamate.

Heretofore, it has been the practice to prepare water-soluble salts of alkylene bis-dithiocarbamic acids such as disodium ethylene bis-dithiocarbamate by the addition of carbon disulfide to a mixture of alkylene diamine and a strong base. In other words, the reaction between the amine and carbon disulfide was carried out in the presence of a strong base. The water-soluble alkylene bis-dithiocarbamates so formed have found use as toxicants for the control of fungi and as intermediates for use in the preparation of water-insoluble metal alkylene bis-dithiocarbamates such as zinc, iron, manganese, or copper ethylene bis-dithiocarbamate. The water-soluble alkylene bis-dithiocarbamates so produced, however, are of low purity, containing by-products as contaminants; as a result the yield of product is poor. Aqueous solutions of alkylene bis-dithiocarbamates such as disodium ethylene bis-dithiocarbamate obtained by this method are relatively unstable; on cooling solids separate and these solids do not redissolve readily on heating; additionally such solutions usually have a rather strong hydrogen sulfide odor and fungicidal preparations made therefrom tend to be phytotoxic, thus limiting their value as agricultural fungicides.

It is an object of this invention to provide improved processes for the manufacture of salts of alkylene bis-dithiocarbamic acids. A further object is to provide processes in which salts of alkylene bis-dithiocarbamic acids are obtained in higher yield and greater purity than heretofore. Another object is to provide more stable aqueous solutions of water-soluble alkylene bis-dithiocarbamates. A still further object is to provide processes yielding aqueous solutions of disodium ethylene bis-dithiocarbamate which have less odor and are less phytotoxic than the aqueous solutions of that salt prepared by the processes used heretofore. Still other objects will become apparent hereinafter.

The foregoing and other objects of the invention are attained by processes in which carbon disulfide is added gradually with mixing to a solution of an alkylene diamine in an inert solvent to form an intermediate reaction product, and the intermediate product is then reacted with a strong base by gradual addition of the base to the intermediate product while mixing.

The alkylene diamines suitable for use in the processes of the invention are those having hydrogen atoms available on the nitrogen atoms of the amine groups; preferably lower alkylene diamines are employed, that is, those containing from 2 to 5 carbon atoms inclusive, namely, ethylene, trimethylene, tetramethylene, or pentamethylene diamine.

The strong bases suitable for use in the processes of the invention are those having a basic (hydroxyl ion) dissociation constant greater than that of the alkylene diamine used, excluding, of course, those bases which are reactive with carbon disulfide such as ammonia and amines having an active hydrogen ion attached to the amine nitrogen. Typical, suitable strong bases are the inorganic metal hydroxides such as sodium, lithium, potassium, magnesium, and calcium hydroxides.

The processes of the invention are preferably carried out in the presence of an inert solvent for the alkylene diamine. Water is the preferred solvent but other solvents such as methanol, ethanol, and isopropanol may also be used. The solvent should be used in amount sufficient to maintain the reacting mass in a fluid, easily stirred form thruout the process.

The presence of the invention may be considered as involving two essential steps or reactions: First the formation of an intermediate reaction product by bringing carbon disulfide and a solution of an alkylene diamine together and next the reaction of a strong base with the intermediate product. The first reaction is effected by gradual addition of the carbon disulfide to the diamine with agitation so as to avoid the presence in the reacting mixture of any substantial excess of unreacted carbon disulfide in the presence of unreacted diamine; in other words, the carbon disulfide is reacted with the diamine substantially as fast as it is introduced. In the second reaction the base is similarly added gradually so as not to exceed its rate of consumption thru reaction with the intermediate and thus avoid the presence of any appreciable excess of free base in the presence of the intermediate product.

Various techniques may be used to bring about the two-reaction process in accordance with the above principles. For example, the processes of the invention may be practiced by feeding a stream of diamine and a stream of carbon disulfide in reacting proportions into a reaction vessel such as a tank or a pipe line reactor with agitation followed by addition of a stream of the base to the reaction vessel in reacting proportions. In adding the base, it is not necessary to wait until the total amount of carbon disulfide and diamine have been first reacted. All that is necessary is that there have been the formation of an intermediate reaction product of carbon disulfide and the diamine with which the base may then react as added. Thus a pipe line reactor, the diamine and the carbon disulfide may be first brought together in reacting proportions in one portion of the pipe and the base then added to the flow of reaction product at a subsequent point in the pipe, care being taken that an excess of the base is avoided in the reacting mass.

Alternatively, processes of the invention may be conducted batchwise by starting the feed of a stream of carbon disulfide into an agitated body of a solution of the diamine followed by the introduction of a stream of the strong base. The carbon disulfide and the base may be added simultaneously during all or any desired part of the reaction cycle, provided that the relative rates of introduction of the carbon disulfide and strong base are coordinated to assure that the intermediate product upon which the base reacts is present thruout the period of addition of the base.

In carrying out the processes of the invention, it is preferred to use a total of at least 2 mols of carbon disulfide for each mol of the diamine and in the order of either one mol or two mols of the base for each mol of diamine, depending on the valency of the base cation, one mol being used, for example, if the base is magnesium hydroxide and two mols with a base such as sodium hydroxide.

The processes of the invention are preferably carried out at a temperature not in excess of about 50° C. and still more preferably in the range of 40 to 50° C. The reactions involved in the processes of the invention appear to proceed almost instantaneously at temperatures within the latter range. Temperatures above 50° C. are not practical in operating the process at atmospheric pressure because of the low boiling point of carbon disulfide, somewhat higher temperatures may be used, however, by operating under pressure, but the product tends to decompose at such higher temperatures. Lower temperatures, say down to about 10° C., may also be employed but then the reaction rates are lower and the carbon disulfide and the base must be added more slowly.

According to a preferred process of the invention, carbon disulfide is added gradually with agitation to an aqueous solution of ethylene diamine at a temperature not substantially in excess of about 50° C. until at least 2 mols of carbon disulfide have been added for each mol of ethylene diamine. This step provides an intermediate product the exact nature of which appears to vary depending principally upon the rate of addition of the carbon disulfide to the diamine; if the rate of addition is rapid, the reacting mass remains liquid but with a slow addition of carbon disulfide, a creamy white solid product forms in the mass. Whether the intermediate product remains as a liquid or forms as a solid during the process has no appreciable effect on the quality, properties and yield of the finished product. Having completed the addition of the carbon disulfide to the ethylene diamine, sodium hydroxide is then added gradually to the intermediate product while agitating and maintaining the temperature at about 50° C. or less until a total of about 2 mols of sodium hydroxide has been added for each mol of ethylene diamine used in the process. There is thus obtained an aqeous solution of disodium ethylene bis-dithiocarbamate.

In the last-mentioned preferred process, it is still further preferred to start with an aqueous solution of ethylene diamine containing 10 to 15% by weight of the diamine, to add a total of about 2 mols of carbon disulfide, to add the sodium hydroxide in the form of an aqueous solution containing 10 to 60% by weight sodium hydroxide, and to maintain the temperature of the reacting mass at about 40 to 50° C. thruout the process. According to this embodiment, the disodium methylene bis-dithiocarbamate product is obtained in the form of a 15 to 35% solution.

The following examples illustrate the invention, all parts being parts by weight.

*Example I*

Water and ethylene diamine are mixed in a reaction vessel to give 146.7 parts of a 12.2% aqueous solution of ethylene diamine. While stirring this aqueous solution and providing external cooling to keep the temperature in the range 42–48° C., a total of 43.3 parts of carbon disulfide are added gradually over a period of one hour and 40 minutes. During the carbon disulfide addition and particularly along toward the end of that addition, there is vaporization of carbon disulfide and these vapors are condensed and return by means of a total reflux condenser. A small amount of hydrogen sulfide is formed during the carbon disulfide addition and is removed from the reaction vessel.

Following the completion of the carbon disulfide addition step, 50 parts of a 50% aqueous solution of sodium hydroxide are added gradually to the resulting suspension of creamy white solid over a period of an hour and 40 minutes. The reacting mass is stirred during the sodium hydroxide addition step and the temperature of the mass is maintained in the range 42–48° C. There is obtained 242 parts of a reddish-orange colored aqueous solution containing 31.5% by weight disodium ethylene bis-dithiocarbamate.

*Example II*

17.9 parts of ethylene diamine and 86.8 parts of water are mixed in a reaction vessel and while stirring and keeping the temperature in the range of 42–48° C., a total of 45.3 parts of carbon disulfide are added gradually over a period of one hour and 40 minutes.

Following the completion of the carbon disulfide addition step, 23 parts of finely ground calcium hydroxide, made into a slurry with 69 parts of water, are added gradually to the resulting suspension of white solid over a period of one hour and 40 minutes. The reacting mass is stirred during the calcium hydroxide addition and the temperature of the mass is maintained in the range 42–48 C. There is obtained 242 parts of an aqueous solution containing 31% by weight of calcium ethylene bis-dithiocarbamate.

Example III 17.9 parts of ethylene diamine, 17.9 parts of water, and 68.9 parts of 95% ethanol are mixed in a reaction vessel and while stirring and keeping the temperature in the range of 41-48° C., a total of 45.3 parts of carbon disulfide are added gradually over a period of one hour and 40 minutes.

Following the completion of the carbon disulfide addition step, 23 parts of finely ground calcium hydroxide, made into a slurry with 69 parts of 95% ethanol, are added gradually to the resulting suspension of white solid over a period of one hour and 40 minutes. The reacting mass is stirred during the calcium hydroxide addition and the temperature of the mass is maintained in the range 42-48° C. There is obtained 242 parts of an ethanol-water solution containing 31% by weight of calcium ethylene bis-dithiocarbamate.

Example IV 22.1 parts of propylene diamine and 204.5 parts of water are mixed in a reaction vessel, and while stirring and keeping the temperature in the range of 42-48° C. a total of 45.3 parts of carbon disulfide are added gradually over a period of one hour and 40 minutes. Following the completion of the carbon disulfide addition step, 50 parts of a 50% aqueous solution of sodium hydroxide are added gradually to the resulting suspension over a period of one hour and 40 minutes. The reaction mass is stirred during the sodium hydroxide addition and the temperature of the mass is maintained in the range 42-48° C. There is obtained 322 parts of an aqueous solution containing 25% by weight of disodium propylene bis-dithiocarbamate.

Example V

Water and ethylene diamine are mixed in a reaction vessel to give 146.7 parts of 12.2% aqueous solution of ethylene diamine. While stirring this aqueous solution and providing external cooling to keep the temperature in the range 42-48° C., 10 parts of carbon disulfide are added over a period of 25 minutes. During the carbon disulfide addition there is vaporization of carbon disulfide and these vapors are condensed and returned by means of a reflux condenser. After the addition of this amount of carbon disulfide, 35.3 more parts of carbon disulfide and 40 parts of a 50% aqueous solution of sodium hydroxide are added simultaneously to the resulting suspension of creamy white solid over a period of one hour and 20 minutes. The flow of the two reagents is regulated so that both are added to a steady rate and completed at the same time. The reacting mass is stirred during the addition of the two reagents and the temperature of the mass is maintained in the range 42-48° C. After these additions have been completed, 10 more parts of a 50% aqueous solution of sodium hydroxide are added while stirring the mass and maintaining a temperature of 42-48° C. There is obtained 242 parts of a reddish-orange colored aqueous solution containing 31.5% by weight disodium ethylene bis-dithiocarbamate.

Example VI 26.25 parts of pentamethylene diamine and 233.5 parts of water are mixed in a reaction vessel, and while stirring and keeping the temperature in the range of 42-48° C. a total of 45.3 parts of carbon disulfide are added gradually over a period of one hour and 40 minutes. Following the completion of the carbon disulfide addition step, 50 parts of a 50% aqueous solution of sodium hydroxide are gradually added to the resulting suspension over a period of one hour and 40 minutes. The reaction mass is stirred during the sodium hydroxide addition and the temperature of the mass is maintained in the range of 42-48° C. There is obtained 355 parts of an aqueous solution containing 25% by weight of disodium pentamethylene bis-dithiocarbamate.

I claim:

1. In a process wherein a salt of an alkylene bis-dithiocarbamate acid is formed by the interaction of an alkylene diamine, carbon disulfide and a metal hydroxide the improvement which comprises forming an intermediate reaction product by adding carbon disulfide gradually with agitation to an alkylene diamine containing from 2 to 5 carbon atoms inclusive and, without separating said intermediate reaction product from the the reacting mass obtained, reacting the intermediate product with an hydroxide of a metal selected from the group consisting of sodium, lithium, potassium, magnesium, and calcium, said steps being carried out at a temperature not substantially in excess of 50° C.

2. In a process wherein a salt of ethylene bis-dithiocarbamic acid is formed by the interaction of ethylene diamine, carbon disulfide and a metal hydroxide the improvement which comprises forming an intermediate reaction product in a fluid reaction mass by adding carbon disulfide gradually with agitation to a solution of ethylene diamine in an inert solvent and reacting the intermediate product with an hydroxide of a metal selected from the group consisting of sodium, lithium, potassium, magnesium, and calcium, by gradual addition of the metal hydroxide to said fluid reaction mass with agitation, said steps being carried out at a temperature not substantially in excess of 50° C.

3. In a process wherein disodium ethylene bis-dithiocarbamate is formed by the interaction of the reagents, ethylene diamine, carbon disulfide and sodium hydroxide, the improvement which comprises first forming an intermediate reaction product in an aqueous reaction mass by adding carbon disulfide gradually with agitation to an aqueous solution of ethylene diamine at a temperature not substantially in excess of 50° C. until not less than about 2 mols of carbon disulfide has been added for each mol of ethylene diamine, and then reacting the intermediate product with sodium hydroxide by gradual addition of sodium hydroxide to said aqueous reaction mass with agitation while maintaining the temperature of the reacting mixture not substantially in excess of about 50° C. until a total of about 2 mols of sodium hydroxide has been added for each mol of ethylene diamine whereby an aqueous solution of disodium ethylene bis-dithiocarbamate is obtained.

4. In a process wherein disodium ethylene bis-dithiocarbamate is formed by the interaction of the reagents, ethylene diamine, carbon disulfide and sodium hydroxide, the improvement which comprises first forming an intermediate reaction product in an aqueous reaction mass by adding carbon disulfide gradually with agitation to a 10 to 15% by weight aqueous solution of ethylene diamine at a temperature of about 40 to 50° C. until a total of about 2 mols of carbon disulfide has been added for each mol of ethylene diamine, and then reacting the intermediate product with sodium hydroxide by gradual addition of a 10 to 60% by weight aqueous solution of sodium hydroxide to said aqueous reaction mass with agitation while maintaining the temperature of the reaction mass at about 40 to 50° C. until a total of about 2 mols of sodium hydroxide has been added for each mol of ethylene diamine used in the process, whereby there is obtained an aqueous solution containing 15 to 35% by weight disodium ethylene bis-dithiocarbamate.

ALBERT L. FLENNER.

REFERENCES CITED

The following references are of record in the file of this patent:

UNITED STATES PATENTS

| Number | Name | Date |
|---|---|---|
| 2,149,858 | Miserentino | Mar. 7, 1939 |
| 2,251,686 | Musselman et al. | Aug. 5, 1941 |
| 2,313,871 | Hanford et al. | Mar. 16, 1943 |
| 2,317,765 | Hester | Apr. 27, 1943 |
| 2,322,783 | Katzman et al. | June 29, 1943 |
| 2,356,764 | Kern | Aug. 29, 1944 |
| 2,457,209 | Clark | Dec. 28, 1948 |